July 26, 1955 R. B. APPLEGATE 2,714,174
ARMATURES FOR ELECTRIC GENERATORS, MOTORS AND THE LIKE
Filed June 23, 1951 3 Sheets-Sheet 1
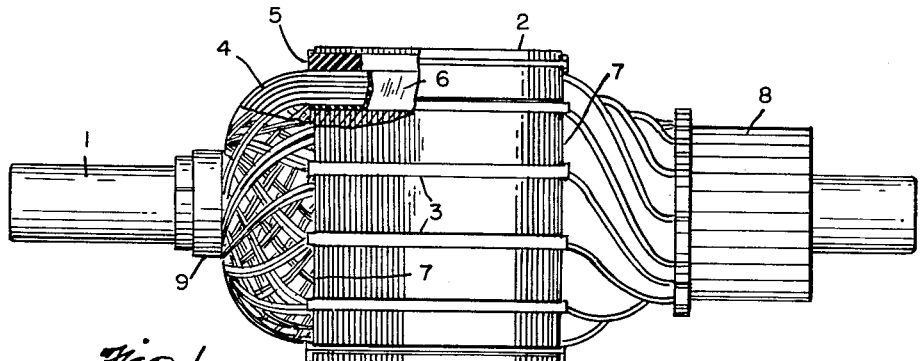
*Fig. 1*
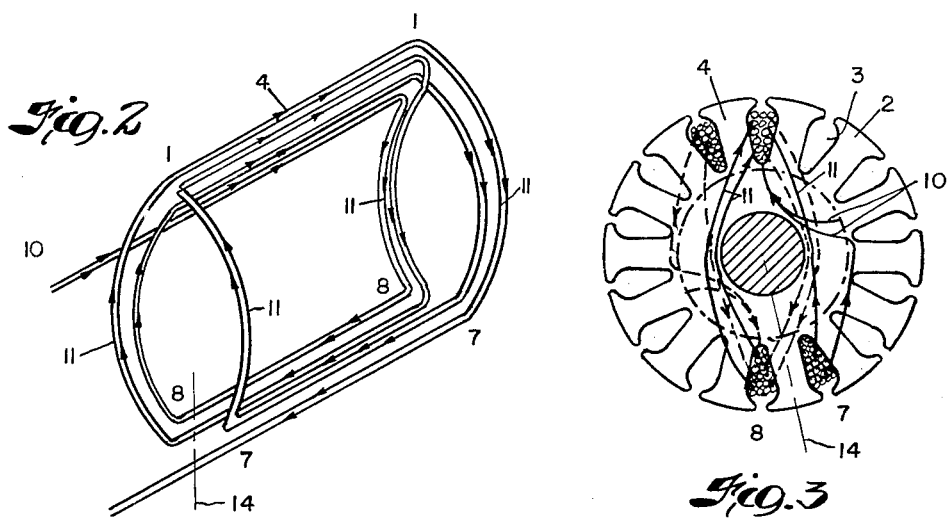
*Fig. 2*
*Fig. 3*
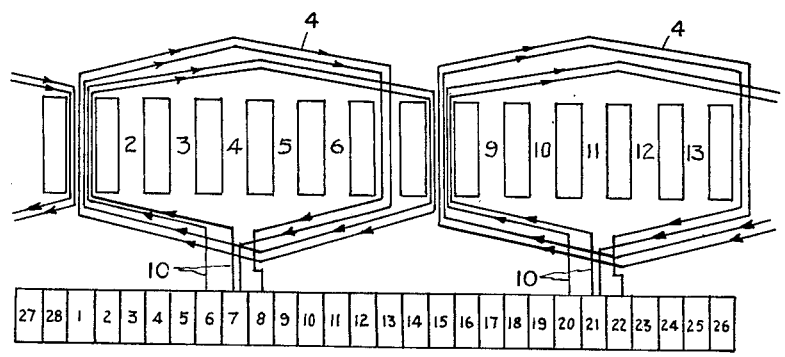
*Fig. 4*
INVENTOR.
ROBERT B. APPLEGATE
BY
Oberlin & Limbach
ATTORNEYS.

INVENTOR.
ROBERT B. APPLEGATE
BY
Oberlin & Limbach
ATTORNEYS.

July 26, 1955 R. B. APPLEGATE 2,714,174
ARMATURES FOR ELECTRIC GENERATORS, MOTORS AND THE LIKE
Filed June 23, 1951 3 Sheets-Sheet 3

INVENTOR.
ROBERT B. APPLEGATE
BY
Oberlin & Limbach
ATTORNEYS.

United States Patent Office 2,714,174
Patented July 26, 1955

2,714,174

ARMATURES FOR ELECTRIC GENERATORS, MOTORS AND THE LIKE

Robert B. Applegate, Cleveland, Ohio, assignor to Cleveland Electrical Equipment Co., Inc., Cleveland, Ohio, a corporation of Ohio Application June 23, 1951, Serial No. 233,223

2 Claims. (Cl. 310—265)

The present invention relates to certain improvements in armatures for electric motors, generators, and the like, including the method of winding the same, and more especially to certain improvements in slotted core armatures which are characterized in that the wire coils are simultaneously wound, as for example, by the apparatuses disclosed in the William P. Hunsdorf Patent No. 2,381,750, dated August 7, 1945, and his copending applications Serial No. 737,006, filed March 25, 1947, now Patent 2,632,603, and Serial No. 136,767, filed January 4, 1950.

Accordingly, it is one main object of this invention to provide an armature embodying the advantages resulting from use of the afore-mentioned Hunsdorf apparatuses, namely: winding of tight, uniform coils having end loops interwoven and interlaced so as to secure symmetry thereof and thereby to resist tendency of the windings to "breathe" or expand under the influence of centrifugal force; winding of coils of substantially equal length and thus of substantially equal resistance; automatic and rapid winding of the coils without hand work; winding of synthetic resin coated wire coils without danger of baring, chipping, scraping, or otherwise damaging the resin insulation incident to winding of the coils on the armature core; winding of coils having end loops of successive turns disposed on opposite sides of the armature shaft thereby further lacing and locking the wires in place to provide a more compact end structure and correspondingly reduced $I^2R$ copper loss; and winding of coils having interlaced and interwoven end loops which afford ventilation for dissipation of heat generated in the armature during its use in a motor, generator, and the like.

It is a further object of this invention to provide a new form of armature (and method of winding) in which the coils are each wound in at least three different slots to achieve further improvements physically and electrically in the armature construction.

It is another object of this invention to provide an armature which, in its preferred form, comprises coils each having one side thereof disposed in one slot of the armature core and the other side of successive turns disposed in a diametrically opposed slot and the next adjacent slot whereby to secure a generally V-shape pattern, reducing end build-up of the end loops of the coils by reason of better distribution of cross-overs of the wires constituting said end loops, effecting a shift in the magnetic neutral plane from a diametrical plane, and enabling winding of coils having a greater number of turns than otherwise possible in machine-wound armatures having coils wound only in paired series of slots.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a side elevation view of an armature constituting the present invention, a portion of the slotted laminated body being cut away to show the interior construction thereof;

Fig. 2 is a perspective view showing coils of the Fig. 1 armature as wound in one slot on one side and in two adjacent slots on the opposite side;

Fig. 3 is an end elevation view to show the disposition of the end loops of diametrically opposed coils in a generally V-shape pattern straddling the armature shaft;

Fig. 4 is a developed view of the diametrically opposed coils illustrated in Fig. 3 showing the connections of the coils to two sets of three successive commutator bars;

Figure 5:
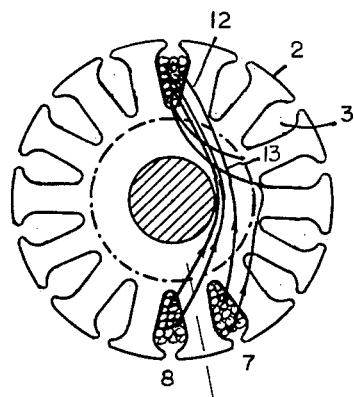
Fig. 5 illustrates a modification in which the end loops of the coil are on one side of the armature shaft.

Referring now in further detail to the drawings and first to Fig. 1, the armature therein comprises a shaft 1 with a laminated body 2 tightly fitted on said shaft, said body being formed with slots 3 axially therethrough into which wire coils 4 are adapted to be wound. As shown, the wires are held in place in the slots by suitable means such as the wedges 5 or the like and, if desired, each slot 3 may be lined with a generally U-shaped insulating member 6. The laminations 7 at opposite ends of said laminated body 2 are preferably formed of insulating material so as to reduce the possibility of scraping of insulation from the wires and consequent short-circuiting and/or grounding (to the core or shaft) of the coils 4. Adjacent one end of said laminated body 2 is a commutator 8 comprising a plurality of bars or segments to adjacent ones of which the ends of each coil 4 are connected. The armature shaft 1 may also have mounted thereon, adjacent the ends of said laminated body 2, insulating sleeves 9.

Having thus described the general construction of one type of armature such as is adapted for use in automotive generators for example, reference will now be made to the windings thereof which constitute the present invention.

As best shown in Figs. 2–4, two conductors 10 respectively connected to the sixth and seventh commutator bars (first bar in line with first slot) pass axially through the first slot of the laminated body (the pair of wires or conductors 10 being represented by a double line in Figs. 2 and 4 and by a single line in Fig. 3 except where connected to the commutator) and successively across the opposite ends of the laminated body and through the seventh and eighth slots of the laminated body 2. With this particular form of winding the end loops 11 are disposed on opposite sides of the armature shaft 1 as shown in Figs. 2 and 3, such disposition of the end loops being controlled as will hereinafter appear in connection with Figs. 8–18. The finishing ends of the two conductors 10 are then connected to the seventh and eighth commutator bars in the manner shown in Fig. 4. Diametrically opposed coils wound in slots 8, 14, and 1 are represented by the dash lines in Fig. 3 and are shown at the right-hand side and extreme left-hand side of Fig. 4.

In Fig. 5 the coil 12 is generally the same as that illustrated in Figs. 2–4 except that the end loops 13 are on one side of the armature shaft 1.

In both cases, however, the magnetic neutral of the diametrically opposed coils 4 and 12 is in the plane 14 passing through the first slot (slots 1 and 8) and midway between the seventh and eighth slots (slots 7, 8, and 14, 1).

When all of the coils 4 or 12 are wound in the slots numbered 1—7—8, 2—8—9, 3—9—10, 4—10—11, 5—11—12, 6—12—13, 7—13—14, 8—14—1, 9—1—2, 10—2—3, 11—3—4, 12—4—5, 13—5—6, 14—6—7 simultaneously as with one of the aforesaid Hunsdorf apparatuses, the end loops 11 or 13 of said coils will be interlaced and interwoven to produce a compact end structure with superior results both mechanically and electrically, and to provide an armature in which the lengths of all of the coils are substantially equal and thus of substantially equal resistance.

Figure 8:
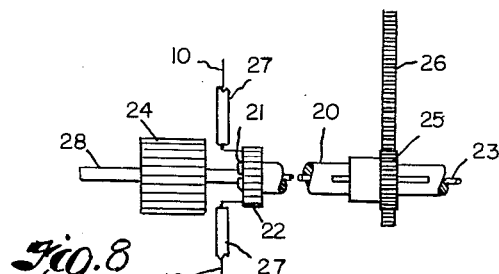
Figs. 8–18 illustrate somewhat diagrammatically the successive steps in the winding of the armature illustrated in Figs. 2–4 for example.

As shown in Figs. 8–18, one preferred form of apparatus for winding coils in an armature, such as illustrated in Figs. 2–4, comprises a reciprocable and oscillatable main shaft 20 provided with a collet 21 at one end and a wire gripping and cutting unit 22 about or adjacent to said collet 21. In Fig. 8 the reference numeral 23 denotes the draw rod for actuating said collet 21 into gripping engagement with the commutator end of an armature core assembly 24 to be wound, said draw rod preferably having a lost-motion connection with the collet whereby upon release of the collet from the armature shaft, the end portion of said draw rod may be moved to push the shaft part-way out of the collet to disengage the hooked wires from the wire cutting and gripping unit 22. Suitable means are provided for reciprocating said main shaft 20 and one convenient mechanism for oscillating said shaft is to have a gear 25 slidably keyed thereon in mesh with a gear or gear rack 26 rotatable about an axis parallel to shaft 20 or reciprocable along a path transverse to said shaft as the case may be. Adjacent the aforesaid collet end of said shaft 20 are a plurality of radially positioned wire feeding fingers 27 corresponding in number and in position with the number of slots (or a division thereof) in the armature core 24 to be wound. The wires or conductors 10 are threaded through the respective fingers 27 and are gripped in said wire gripping and cutting unit 22 as shown in Fig. 8, the wires being supplied from reels (not shown) preferably disposed adjacent the outer ends of the respective feeding fingers.

Figure 9:
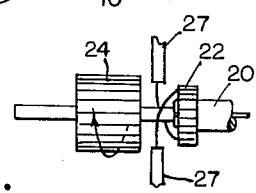
Figure 10:
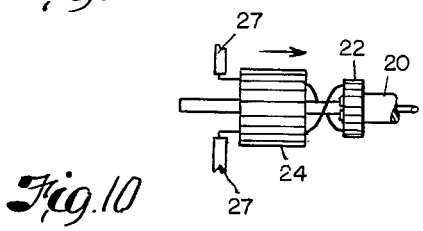
Figure 11:
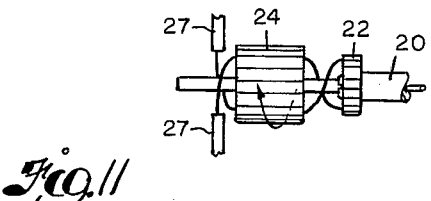
Figure 12:
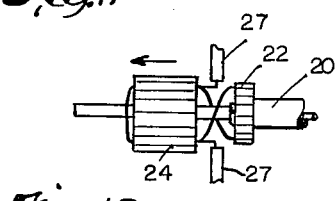
Figure 13:
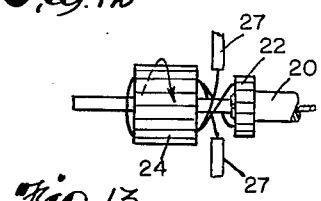
Figure 14:
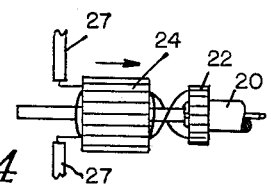
Figure 15:
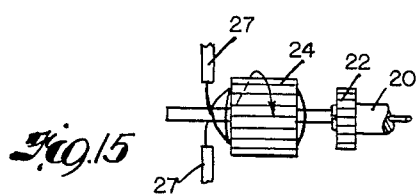
Figure 16:
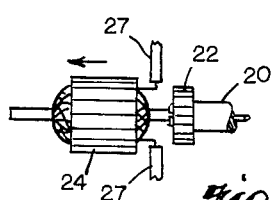

Following is an outline of the operation of the aforesaid apparatus to produce the armature of Figs. 2–4:

(1) Clamp armature shaft 28 in main shaft 20 and position the main shaft so that the plane of the wire feeding fingers 27, and thus the winding throat defined thereby, is disposed between the wire gripping and cutting unit 22 and the laminated body of the armature core 24 as shown in Fig. 8;

(2) Rotate the main shaft 20 and armature core 24 gripped thereby in the direction of the arrows as shown in Fig. 9 to rotate the latter seven slots in a fourteen slot armature. Such roll-over of the main shaft 20 and armature core 24 causes the wires 10 to be interlaced as shown;

(3) Shift the main shaft 20 in the direction shown by the arrow in Fig. 10 to draw the armature 24 through the winding throat whereby the wires 10 drawn through fingers 27 are positioned in the armature slots;

(4) Roll over the main shaft 20 as in Fig. 11 in the same direction as step 2, but eight slots instead of seven;

(5) Shift the main shaft 20 in the direction of the arrow in Fig. 12 to again move the armature core through the winding throat to again lay the wires 10 into the armature slots;

(6) Roll over the main shaft 20 eight slots in the opposite direction as shown in Fig. 13;

(7) Shift the main shaft in the direction shown in Fig. 14 to lay wires 10 again into the armature slots;

(8) Roll over the main shaft 20 seven slots in such opposite direction as indicated in Fig. 15;

(9) Move the main shaft 20 in the direction indicated in Fig. 16 to shift the armature through the winding throat thereby laying wires 10 again into the armature slots;

(The foregoing steps 2–9 are then repeated in case the armature is to have coils with a greater number of turns.)

Figure 17:
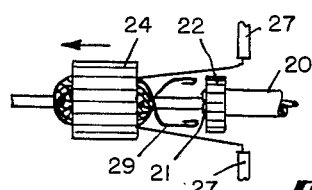
Figure 18:
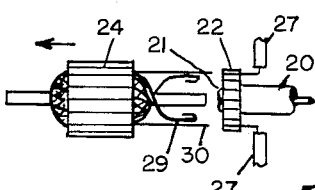

(10) Release the collet 21 and also the gripping and cutting unit 22 so that when the now fully wound armature core 24 is moved in the direction of the arrow in Fig. 17 as by leftward movement of the draw rod 23 relative to collet 21, the starting hooked ends 29 of the wires 10 are withdrawn from the gripping and cutting unit, the fingers 27 being also moved radially outwardly to allow the unit 22 to pass through the winding throat to armature unloading position;

(11) Move the wire feeding fingers 27 radially inward to position the finishing ends 30 of the wires 10 in the wire gripping and cutting unit 22 whereby, upon actuation of said unit, the wires 10 are cut to release the wound armature 24 and at the same time the adjacent ends of the wires leading to the feeding fingers 27 are gripped preparatory to winding the next armature core 24. The wound armature may then be freely moved toward the left as shown in Fig. 18 and an unwound core inserted in collet 21.

Figure 6:
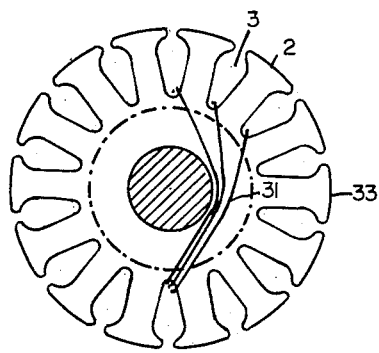
Figs. 6 and 7 illustrate two further modifications in each of which one side of each coil is disposed in one armature slot and the other side of successive turns of each coil are disposed in three different slots.
Figure 7:
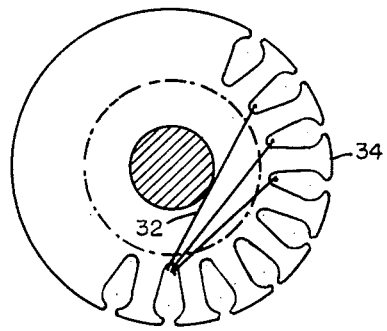

Further modifications of the coils are illustrated in Figs. 6 and 7, and in such modifications one side of each coil 31 and 32 respectively passes through one slot of the armature core 33 and 34 respectively, whereas the other side of each said coil successively passes through three different and preferably adjacent slots to provide still different patterns of end loops from those illustrated in Figs. 2–5 for example.

Figure 19:
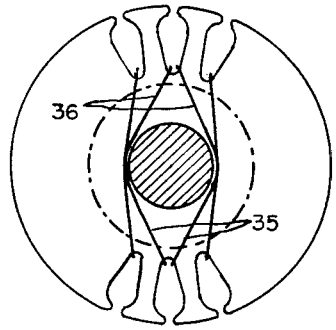
Fig. 19 is a view similar to Fig. 3 illustrating a further modification.

In addition to the aforesaid coils 4, 12, 31, and 32, it is desirable in some instances to skip one or more slots rather than placing the successive turns in two or three adjacent slots. See for example Fig. 19 in which the diametrically opposed coils 35 and 36 each have one side of the several turns in one slot and the other side of alternate turns in slots on opposite sides of a diametrically opposed slot.

As previously indicated, distributive windings of the character herein described have certain advantages such as increased efficiency by reason of shorter copper and thus reduced $I^2R$ loss. Moreover, the shape and size of the end build up of the windings can be controlled by varying the particular type of winding. Thus it is possible to form coil ends which are generally rounded or hyperbolic or which are of a more square or blunt form and shorter in a direction axially of the armature.

It has further been noted that when two conductors are wound at the same time into all of the slots in the pattern of winding described in Figs. 8–18 to wind the coils of Figs. 2–4, the wires will lie adjacent one another in groups of four conductors on one end of each coil whereby to reduce the crossovers of the end loops and thus achieve minimum end build up of the coils.

It is to be understood that in the foregoing examples employing a fourteen-slot armature wound for example with four turns of two conductors 10 of synthetic resin coated No. 15 copper wire for automotive generators, the basic features of the present invention are applicable to a variety of different types of armatures with different numbers of slots, different distribution of the windings, sizes and shapes of wires, etc. Similarly, while in the present case the commutator 8 includes twenty-eight bars, in some instances the number of bars may be equal to or more or less than the number of slots in the armature core.

Moreover, although the present invention may have its greatest utility in connection with bipolar motors or generators, it will be apparent to those skilled in the art that the same principles of winding may be applied in connection with the winding of armatures for multipolar motors and generators.

In the case of commutating motors and generators, the fundamental requirement for proper commutation is that the current shall be completely reversed before a coil is again cut into the circuit after being short-circuited by a brush, so that at the instant the commutator bar breaks contact with the brush there shall be no current flowing from the bar to the brush. Otherwise, sparking will occur between the brush and the bar. Of course, in motors it is common practice to shift the brushes forward in the direction of rotation. In the present case, the distributive windings serve to shift the magnetic neutral so as to extend from one slot on one side of the armature to the other side of the armature between the adjacent slots in which the coil is wound. As previously indicated, this shifting of the magnetic neutral one-half slot in the case of the armatures illustrated in Figs. 2–5 effects improvements in the physical and electrical characteristics of the armature as compared with an armature having opposite sides of the coils wound in diametrically opposed slots.

The present armature, by reason of simultaneous winding of all of the coils, has coils of substantially equal length and thus of substantially equal resistance. In addition, the coils have identical generating ability because the physical position of all of the coils is the same with respect to the armature slots. The interlaced and interwoven tight end structure effects uniform cooling of the coils and, of course, the simultaneous winding results in uniform pressure between the wires to firmly hold the wires in place against "breathing" owing to centrifugal force and to increase the life of the insulation of the wires.

Actual tests run with armatures having the coils thereof simultaneously wound and armatures having lap-wound coils wound successively, one at a time, show that the machine wound armature is superior in all respects, particularly in a lower temperature rise which is of a magnitude indicating at least twice the insulation life in view of an old rule of thumb regarding temperature limits of electrical machines.

In using the aforesaid Hunsdorf apparatuses for winding armatures for universal motors such as are used in vacuum cleaners, domestic appliances, various machine tools, etc. and having coils with many more turns than herein shown wound in paired series of slots, difficulty has been encountered in placing so many wires into the slots and in limiting the end build-up of coils within prescribed limits owing to both radial and end build-up by numerous cross-overs of the end loops. The present armature and method not only eliminates the aforesaid physical difficulty by spreading the cross-overs so as not to build up in the manner of a rail fence, but enables duplication of or exceeding the electrical performance of the armatures having standard lap-wound coils in paired series of slots.

As best shown in Figs. 3 and 4, and particularly the latter, opposite coils wound in slots 1—7—8 and 8—14—1, for example (and similarly opposite coils wound in slots 2—8—9 and 9—1—2; 3—9—10 and 10—2—3; 4—10—11 and 11—3—4; 5—11—12 and 12—4—5; 6—12—13 and 13—5—6; and 7—13—14 and 14—6—7) have conductors disposed in the slots in parallel adjacent relation. While the direction of winding of the wires of opposite coils in slots 1 and 8 as indicated by the arrows in Fig. 4 is in opposite directions through such slots, the current flow through such parallel adjacent wires at the time of shorting of the coils, is in the same direction. Since, in this example where the current flow is in the same direction and where one-half of the wires of each coil are out of the slots in question, the inductive reactance voltage is reduced as compared with full pitch wound coils. As shown, two turns of each of the opposite coils 1—7—8 and 8—14—1 in slots 8 and 1 respectively lie immediately adjacent to two of the four turns of the other coil in such slots. The opposite coils in Figs. 3 and 4 start respectively at the 6th and 20th commutator bars (there being 28 bars with the 1st bar in alignment with the 1st of the 14 slots of the armature core) and pass through slots 1—8—1—7 to the 7th bar and slots 8—1—8—14 to the 21st bar. The other one of the two wires wound into the same slots has its ends connected with the 7th and 8th bars and with the 21st and 22nd bars respectively.

Also, because one-half of the end loops of the coils are disposed on one side of the armature shaft and the remaining one-half of the end loops are disposed on the opposite side of the armature shaft, there is effected a still further reduction in the inductive reactance voltage.

Other modes of applying the principle of the invention may be employed, change being made as regards the details described, provided the features stated in any of the following claims, or the equivalent of such, be employed.

I therefore particularly point out and distinctly claim as my invention:

1. The method of winding a slotted armature having a commutator at one end formed with twice as many commutator bars as armature slots, which comprises the steps of simultaneously winding pairs of wires into a number of pairs of coils corresponding to the number of armature slots by placing one side of each turn of each pair of coils into one armature slot and the other side of successive turns of each pair of coils alternately in only two adjacent armature slots, one of which is substantially diametrically opposite such one slot, and connecting the ends of each pair of coils respectively to three adjacent commutator bars of which the intermediate bar is common to the end of the coil formed by one of the pair of wires and to the start of the coil formed by the other one of the pair of wires.

2. An armature for electrical apparatus comprising a body formed with a series of slots extending from one end to the other of said body, a shaft in said body extending beyond the ends of said body, a commutator on said shaft axially spaced from the adjacent end of said body and having twice as many commutator bars as there are slots in said body, and pairs of wire coils in such slots each having end loops extending across the opposite ends of said body, each said pair of coils having one side of successive loops thereof disposed in one slot and the other side of successive loops alternately and equally distributed in only two other adjacent slots, one of which is substantially diametrically opposite such one slot, the four leads of each pair of coils being connected to three adjacent commutator bars with the starting and end leads of one coil connected respectively to the first and second of said three adjacent commutator bars and the starting and end leads of the other coil connected respectively to the second and third of said three adjacent commutator bars.

References Cited in the file of this patent

UNITED STATES PATENTS

| | | |
|---|---|---|
| 679,284 | Lau | July 23, 1901 |
| 1,298,705 | Hellmund | Apr. 1, 1919 |
| 2,632,603 | Hunsdorf | Mar. 24, 1953 |

OTHER REFERENCES

"Automatic Armature Winding in Less than One Minute," in Electrical Manfacturing, vol. 39, No. 6, pp. 111–114 and 196.